(12) United States Patent
Mitra

(10) Patent No.: US 7,503,504 B2
(45) Date of Patent: Mar. 17, 2009

(54) TRANSACTION CARD SUPPORTING MULTIPLE TRANSACTION TYPES

(75) Inventor: Twisampati Mitra, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 11/300,890

(22) Filed: Dec. 15, 2005

(65) Prior Publication Data

US 2007/0138299 A1 Jun. 21, 2007

(51) Int. Cl.
*G06K 19/06* (2006.01)
(52) U.S. Cl. .................. 235/492; 235/380; 235/493
(58) Field of Classification Search .................. 235/492, 235/380, 493
See application file for complete search history.

(56) References Cited

U.S. PATENT DOCUMENTS

| 6,012,636 | A | * | 1/2000 | Smith | 235/380 |
| 7,044,394 | B2 | * | 5/2006 | Brown | 235/493 |
| 7,083,094 | B2 | * | 8/2006 | Cooper | 235/449 |
| 7,191,952 | B2 | * | 3/2007 | Blossom | 235/492 |

* cited by examiner

*Primary Examiner*—Seung H Lee
(74) *Attorney, Agent, or Firm*—Schwegman, Lundberg & Woessner, P.A.

(57) ABSTRACT

A transaction card comprises a memory operable to store a plurality of transaction profiles associated with a transaction card holder. A user interface on the transaction card is operable to receive input from the transaction card holder, and a communications interface is operable to convey one of the plurality of transaction profiles selected via the user interface to a transaction party other than the transaction card holder.

10 Claims, 4 Drawing Sheets

TRANSACTION CARD SUPPORTING MULTIPLE TRANSACTION TYPES

FIELD

The embodiments relate generally to a card for use in a magnetic stripe card transaction system, and in a more specific embodiment to a card able to emulate multiple magnetic stripe cards in a transaction system.

BACKGROUND

Magnetic stripe cards are presently used for a variety of purposes, but are perhaps best known for their application to credit cards used by most consumers. The magnetic stripe encodes data such as the credit card number, expiration date, and name of the card owner so that this information can be quickly and accurately conveyed through use of a magnetic stripe reader to a cash register or other electronic system for identifying the credit card in a transaction.

An average consumer by some estimates uses in excess of ten such transaction cards, and carries a variety of such credit cards, identification cards, and other transaction cards at any given time. Many such consumers carry such a number of transaction cards because different cards include different program features or benefits, such as discounts at particular issuing stores or cash back or some other reward for use, or provide unique functions such as identification for entering a building.

Although many consumers wish to carry or keep track of fewer cards than they have and use, the cards are issued by different organizations, and inclusion of multiple magnetic stripes representing different credit accounts on the same card has not been widely considered a practical solution. It is therefore desired to provide a method or system enabling a consumer to reduce the number of magnetic stripe cards that must be carried.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Various embodiments of the invention address the desire to carry fewer transaction cards by providing a single card operable to substitute for multiple transaction cards. One such embodiment includes a wireless link able to communicate a selected transaction identifier such as a credit card number to a card reading device, while other embodiments further include the ability to rewrite or emulate the magnetic stripe on a traditional magnetic card for backward compatibility with common magnetic stripe readers used to swipe credit cards on most point of sale cash register systems today.

A typical consumer might carry five different cards for different credit card companies, one or more automated teller machine (ATM) cards for banking, library cards, health insurance cards, auto insurance cards, promotion cards, rebate cards, gas cards, etc. The list of cards keeps growing as companies provide new promotional programs and associated cards for customers. As a result, the customers and service providers that use and provide the cards spend considerable time and money to produce and manage the cards as well as the supporting infrastructure. The burden of managing and carrying the cards in anticipation of a variety of transactions is therefore undesirable.

Figure 1:
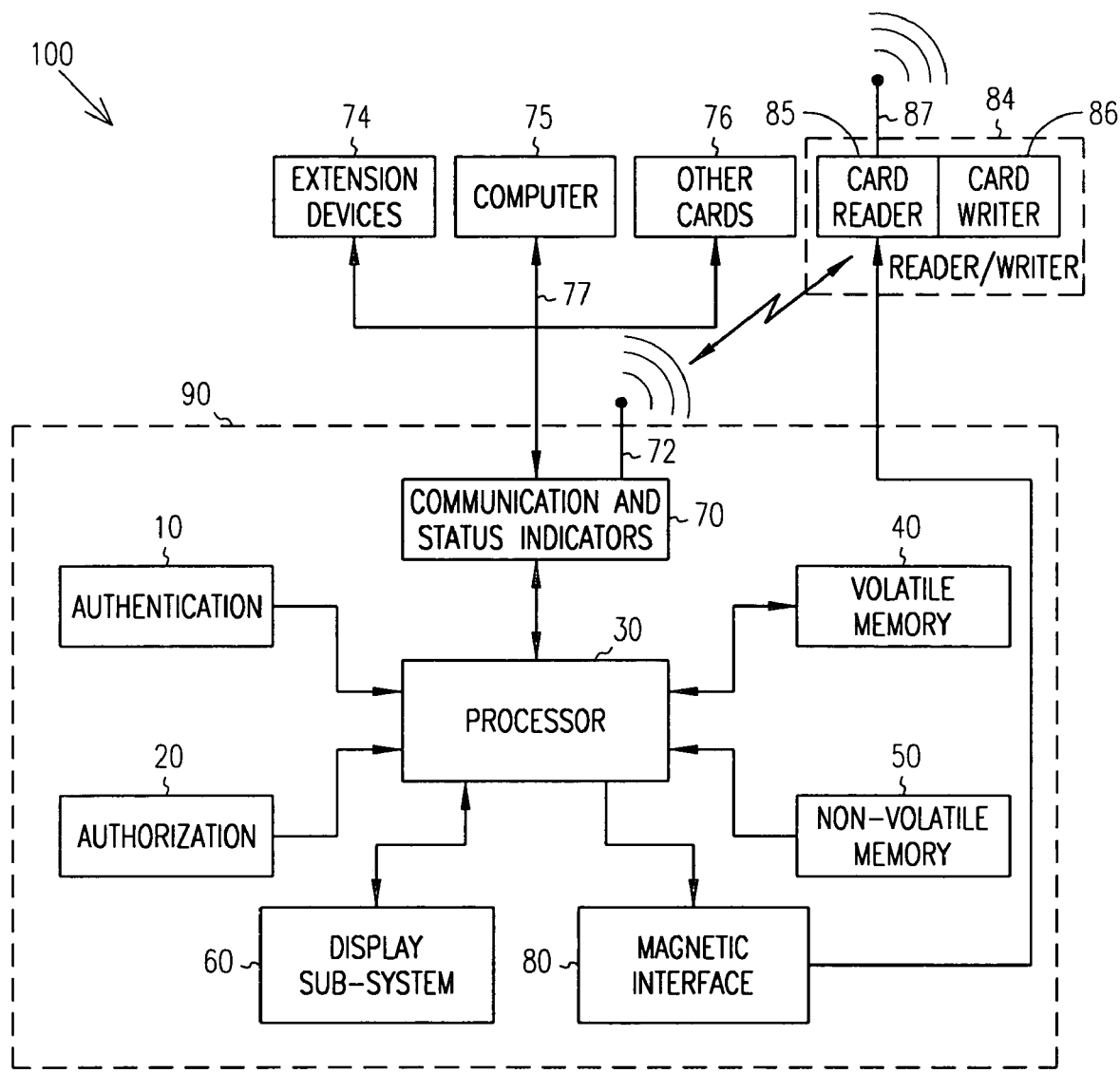
FIG. 1 is a block diagram of a card based system in accordance with various embodiments of the present invention.

FIG. 1 is a block diagram of a system 100 in accordance with some embodiments of the invention. In an embodiment, card device 90 includes an authentication block 10 which includes firmware and/or software that execute on processor 30 to perform an authentication operation. Authentication is a process of verifying that the holder of a card is the same person to whom the card was issued. Because security is an integral part of the system, in an embodiment, immutable biometric characteristic information such as fingerprint patterns may be read by a card-based sensor and used by the authentication block 10 on the card to provide added security by blocking use of the card when verification that the holder is the person to whom the card was issued has failed. Some other embodiments use personal identification numbers (PIN numbers) or other security measures in addition to or in place of a biometric verification system.

In an embodiment, the card 90 has embedded software having an operating system, device drivers, graphical user interface (GUI), and other application software for different purposes and applications. That software resides on one or more modules carried by card 90. The specific blocks or modules 10, 20, 30, 40, 50, 60, 70 and 80 have that software associated with their functioning as part of those blocks. It will be realized that the division of the card apparatus in FIG. 1 into the various blocks is to illustrate and explain the operation of the apparatus rather than indicating that the apparatus is actually divided into the separate physical blocks shown. In an embodiment all of the specific blocks and modules shown in FIG. 1 are carried by the card. New or updated software can be down loaded through any of the communication mechanisms mentioned hereinafter.

In various embodiments, the processor 30 is coupled to authorization block 20. In an embodiment, an authorization block 20 is included in card device 90. Authorization block 20 may comprise firmware and/or software that executes on processor 30. In various embodiments, after an authentication process is completed and verified that card user is owner, authorization of a requested transaction is performed. Authorization is the process of confirming that authenticated user is eligible to make the requested transaction. The card of the verified owner performs authorization inquiries to determine whether the transaction requested is authorized.

In an embodiment, the authorization block 20 requires communication with an outside agent (e.g. card issuer) to verify the current status of the card holder and determine whether the request for a transaction can be authorized. In an embodiment the authorization process has already been carried out and information on what transactions are authorized can proceed based upon information stored on the card. In an embodiment, then the authorization block 20 actually authorizes the transaction based on stored authorization information.

In an embodiment, the authorization may be accomplished by processor 30 sending an authorization request through communication and status indicators 70. In an embodiment the authorization request is communicated through antenna 72. In an embodiment the authentication request is sent by communication block 70 and antenna 87, through card reader 85, through a network to an agent (not shown).

Various methods can be used for backward compatibility but, card 90 also provides for future communication mechanisms through radio and/or satellite communication that can be done before or during a transaction to speed up the authorization process. As shown in FIG. 1, in an embodiment antenna 72 may communicate with an external device 74 which receives a wireless signal from card 90 and communicates with remote authentication equipment by a system such as broadband wireless or some other long range wireless communication protocol. Link 77 may be a wired connection or a wireless coupling.

In various embodiments, the processor 30 performs necessary computations, such as providing the logic for transaction process from authentication and validation through other operations described below to a finish. It also controls the display sub-system 60 to allow two-way communications and allows for user input, activating the communication block 70 for communication with external devices 74, 75, and 76 to the card when necessary. The processor 30 interacts with the magnetic interface 80 or the communication interface 70 to provide the code for a desired transaction card to be used at any time. In an embodiment, for added value to the card owner, the processor 30 functions as a calculator, a calendar, a secure storage device for storing data such as passwords, or for other common electronic device functions. In one such embodiment, the transaction card is able to convey a securely stored password to an external device or to a user via the display 60 once the user's identity has been verified.

In an embodiment, the processor 30 is coupled to volatile memory 40. Volatile memory 40 can be used by the processor 30 to do intermediate computations that need not be stored permanently. For example, volatile memory 40 stores a finger print input by the user while comparing it to one stored in non-volatile memory 50. In an embodiment, volatile memory 40 includes various kinds of random access memory (RAM).

In an embodiment, the processor 30 is coupled to non-volatile memory 50. Non-volatile memory 50, for example read only memory (ROM), can store information permanently. Non-volatile memory 50 can be used to keep permanent stores of information including, but not limited to: multiple card profiles and their graphics, codes, balances, transaction, fingerprints, etc. Non-volatile memory can be retrieved by the user via display sub-system 60 or communicated to another computer using the cards communication block 70 as long as proper authentication is performed.

In an embodiment, the processor 30 is coupled to the display sub-system 60. In various embodiments, the display sub-system 60 includes all the logic & controls to drive a thin film touch-sensitive display sub-system 60, for example. Further the display sub-system 60 can also be driven by a thumbwheel, keys, other mechanical interface or any combination of them (not shown). In various embodiments, display sub-system 60 is mechanically flexible, so display 60 doesn't get damaged with reasonable mechanical stress on the card 90. The display sub-system 60 is instructed from the processor 30 and the data/graphics to be displayed from either the volatile 40 or non-volatile memories 50.

In an embodiment, the processor 30 is coupled to magnetic interface 80. The magnetic interface 80 aids in maintaining backward/downward compatibility with the current magnetic stripe card encoding and reading mechanism used by most types of card systems. Based on the user input, the processor 30 provides reader/writer 84 including the card reader 85 and card writer 86 with a unique code that identifies a specific card or transaction. A user then swipes the card 90 through the card writer 86 re-programs card 90. Then the magnetic interface 80 reads the programmable magnetic stripe (shown infra) to continue the transaction.

In an embodiment, the processor 30 is coupled to communication and status indicators 70. The communication and status indicators 70 is intended to use any form of electromagnetic/optical signal to communicate with reader/writer 84 external devices 74, other cards 76 or a computer 75. In various embodiments, the communication and status indicators 70 uses wired or wireless communication mechanisms (radio or satellite communication, for example) to communicate with the reader/writer 84. In other embodiments, card 90 may receive programming information through an extension device 74 through reader/writer 84 to card writer 86. In various embodiments the programming information may be received by card writer 86 via wireless link with antennas 72 and 87. The communication and status indicators 70 communicates with point of transaction/sale card readers 85 or with a source that is part of the card issuing organization through card reader 85 and the network. In various embodiments, the communication and status indicators 70 are wirelessly coupled by antennas 72 and 87 to reader/writer 84. Antennas 72 and 87 include a directional or omni-directional antenna, including, for example, a dipole antenna, a monopole antenna, a patch antenna, a loop antenna, a microstrip antenna, or various other types of antennas suitable for transmission and/or reception of data packet signals.

The processor 30 analyzes the data from card reader 85 and takes appropriate actions, such as for example, stores a new profile, stores new discounts, stores new balances, etc. The status indicators 70 are displayed by display sub-system 60 on a face of the card 90 and are used to inform the user about the current information such as balances, errors, etc. This user feedback is important so a communication can take place only when the user is authenticated 10 and authorized 20. In various embodiments, the card user then takes action based on the status indicators 70.

In an embodiment, the communication and status indicators 70 couple a computer 75 to processor 30 via link 77. Link 77 is either a wired connection or a wireless coupling. Computer 75 includes a general purpose, home or personal computer, for example. In an embodiment the computer 75 executes accounting software so that the computer 75 can, for example, display recent charges, balances, library books checked out and the due date or recent discounts and the items and amounts thereof. The computer 75 may synchronize its information base with the information on the card 90 so that the software executing on the computer 75 provides up-to-date information to the user.

Further, the computer 75 is able to upload some information to the card 90. Since security is of great importance, at present the uploaded information may typically include just basic information name and address, for example, until computer security provides added safety.

In an embodiment, link 77 is also coupled to one or more extension devices 74. These extension devices include, but are not limited to global positioning system (GPS) units, radio frequency identification (RFID) tag readers, bar code readers, personal information systems like handheld ones, cell phone, digital camera or games, etc. These extension devices 74 have the ability to read codes like RFID, bar code or other kinds of codes. In an embodiment, then through the embedded software and processor 30 and processors (not shown), the extension device has the ability to interpret the codes and take appropriate action. In one such example embodiment, the card 90 is able to read RFID tags on products in a store, and to calculate a running total cost as the user selects items. Then extension device 74 can keep track of the item in a virtual shopping cart and also, keep track of costs. A user then has the ability to modify the shopping cart based on what he is willing to pay and is able to make intelligent shopping decisions based on the cumulative and individual costs of items that is continuously be updated on the display 60 of card 90.

In an embodiment, link 77 is coupled wirelessly or by wired line to other cards 76, such as card 90. These other cards 76 have specific functions and all these devices that connect and communicate with each other through their communication mechanisms (e.g. wired, wireless, etc.) collectively provide the functionality of a "Personal Digital Wallet" (PDW) that can address most of the needs (e.g. transactions, communication, information, analysis, etc.) of a person in the digital world in a seamless manner.

In an embodiment, one extension device 74, for example, is a "location device" like a GPS system that provides the user with information on the type kind of transactions he or she can make based on locality in which he or she is currently. In other embodiments, cards 76 include, but are not limited to, communications or games.

Figure 2:
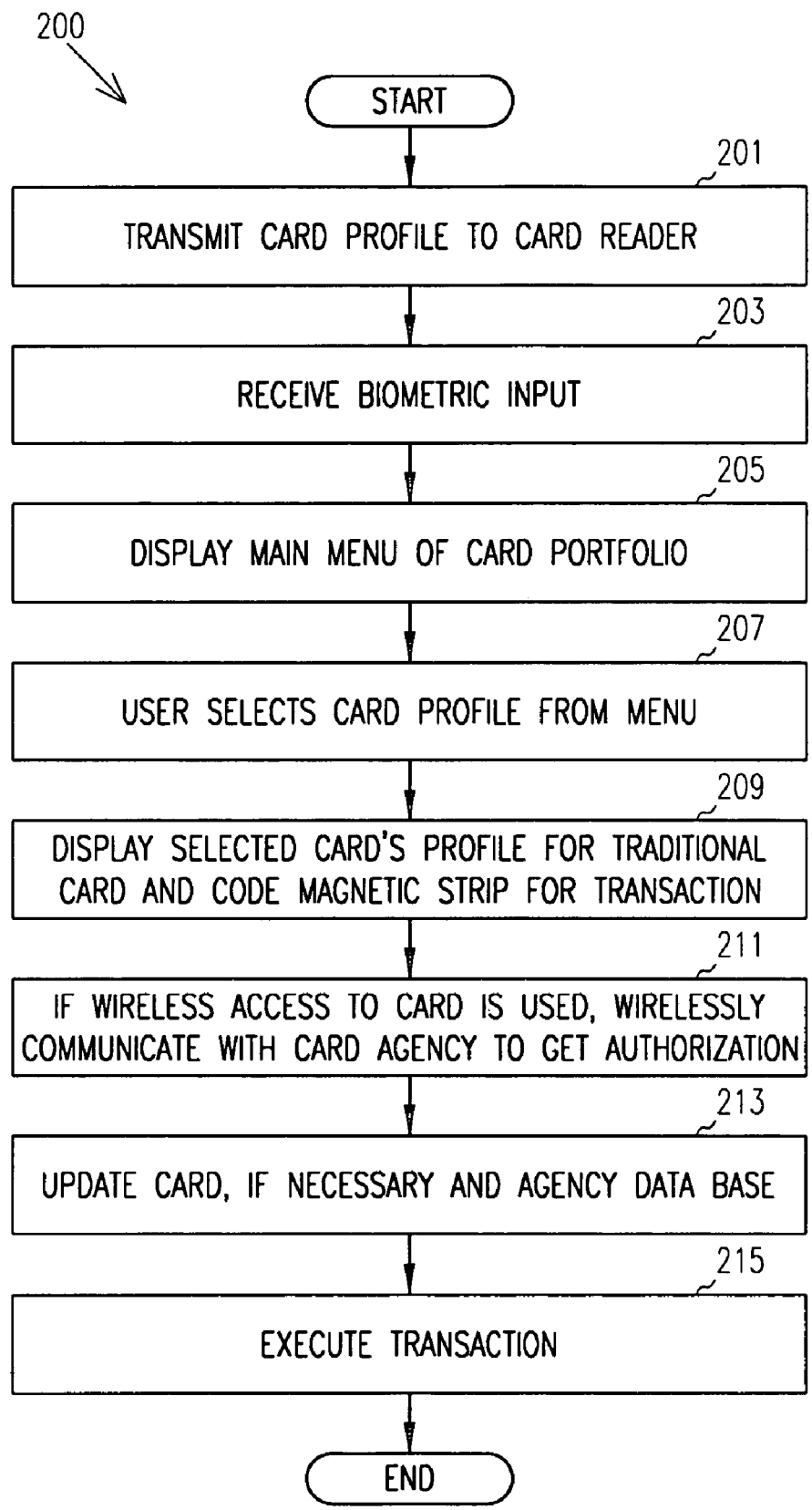
FIG. 2 is a flow chart of a method for multiple user transactions in a card based system in accordance with various embodiments.

FIG. 2 is a flow chart of a method for multiple user transactions 200 in a card based system in accordance with various embodiments of the present invention. The method 200 is started and block 201 is entered. Initially, a transaction card profile is transmitted through reader/writer 84 to the card reader 85, block 201. In various embodiments, this information includes the identity of card user, credit limits, amount currently pending, and personal identification, such as personal identification number (PIN), fingerprints or retinal scan information. The transaction type may be a credit card purchase, for example. The transaction data exchanged is in some embodiments restricted in signal strength, in radio frequency, or in other characteristics to limit the range over which the transmitted profile information can be received to ensure security and privacy of the transmitted transaction data.

Next, a biometric input is received via reader/writer 84 by the card reader 85, block 203. The biometric input may be a fingerprint or retinal scan, etc, received through a sensor (not shown). An additional security mechanism, for example PIN number, can also be used.

Figure 5:
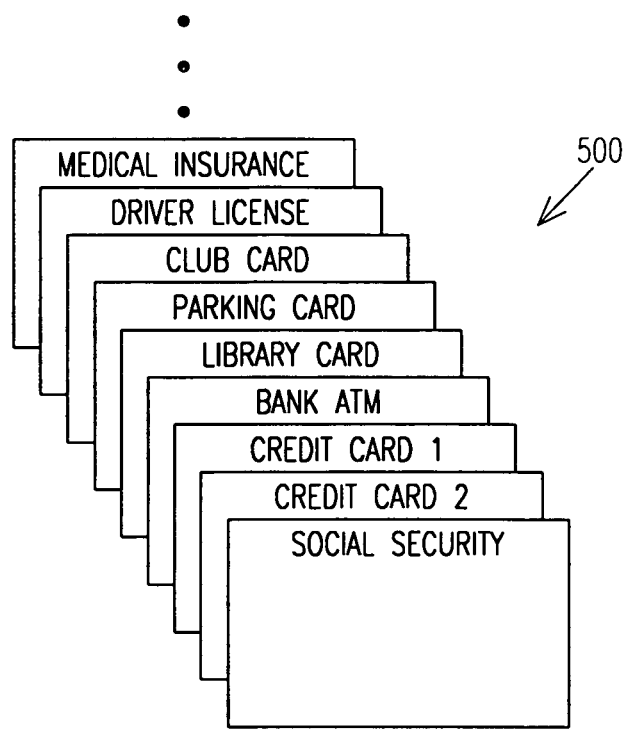
FIG. 5 is a graphic display arrangement for card based system in accordance with various embodiments.

Then a main menu 500 similar to that shown in FIG. 5 is displayed on the display surface, typically the face of card 90, block 205. The menu 500 is an example of the transaction types supported by card 90. In an embodiment, the card user then select the card, transaction type and associated profile he or she wishes to use for the transaction from the menu 500 shown in FIG. 5, block 207.

The profile includes data such as for example, identification number, date of expiry, support information, graphics to be displayed for the card etc. Once the profile is delivered to the card 90 and displayed, the card user acknowledges using the authentication process 10. The authentication process, as mentioned earlier, includes but is not limited to: biometric information (e.g. finger print, retinal scan) recognition supplemented by user identification.

The communication and status indicators 70 show graphically the issuing agency authorization of the card transaction, block 209. Thus, a multiple number of card issuing agencies can have their authorized cards on one single card device 90 and be authenticated by only one user using redundant mechanisms to ensure security and authenticity of the card.

At the touch of a menu item by the card user, the card user selects a particular card from menu 500 relevant for the transaction at hand and the processor 30 displays on display 60 the graphics associated with the selected card in the display. The display presents to the user as if the user has just been handed a very specific card.

In addition, for use of card 90 with a traditional magnetic stripe card reader 85, processor 30 may cause the card writer 86 to code card 90 for compatibility with the selected transaction, block 209.

Once the authentication is complete, if the card 90 is using a wireless access via antennas 72 and 87, wireless communication between the card 90 via card reader 85 and the network takes place to authorize the particular transaction, the credit card purchase, for example, block 211. In an embodiment, the authorization 20 and the transaction itself are performed using electronic, radio or satellite communications. As a result, there is almost an instantaneous update of records, both at the issuing agency of the card 90 as well as on the user's card device 90, block 213.

In an embodiment, the transaction is then executed and completed, block 215. Then the process is ended.

The user may occasionally update his/her own computer 75 and synchronize his/her computer's data with data on card 90 using many kinds of software that are available to keep track of accounts, items, etc.

Figure 3:
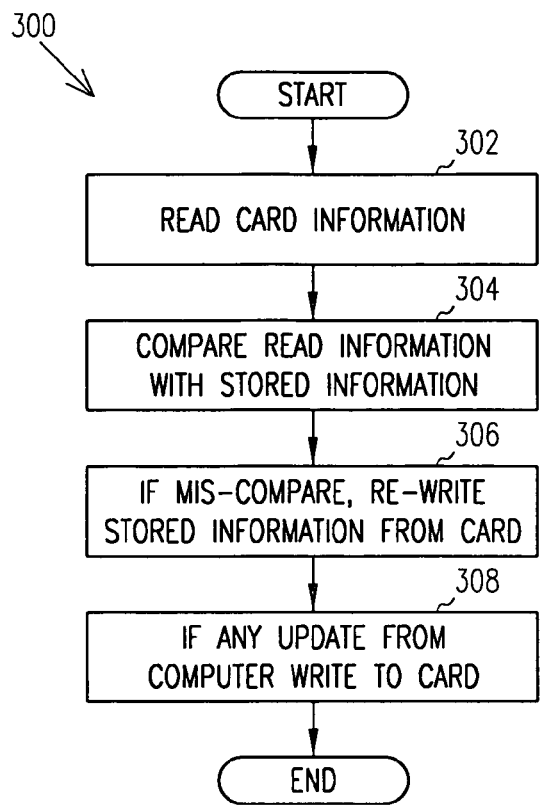
FIG. 3 is a flow chart of a method for card based system computer interface in accordance with various embodiments.

FIG. 3 is a flowchart of a method 300 for card based system/computer interface in accordance with various embodiments of the present invention. The method 300 for card 90 based system 100/computer 75 interface is started and block 302 is entered.

The information for each of the card types is read from card 90, block 302. In an embodiment and due to security reasons, the computer 75 is only allowed to read dynamic data such as current sales or library book identities.

Then the information which computer 75 was allowed to read from card 90 is compared with the information previously store for that card type, block 304. That is the list of sales or credits on a particular credit card are compared to the previous list stored on the computer 75. Similar comparisons for each card type may be made.

If a mis-compare is detected, the store information in computer 75 is re-written with the information stored in card 90, block 306. Then, if there are any updates for the card 90, computer 75 writes such information to card 90, block 308. The process is then ended.

Figure 4:
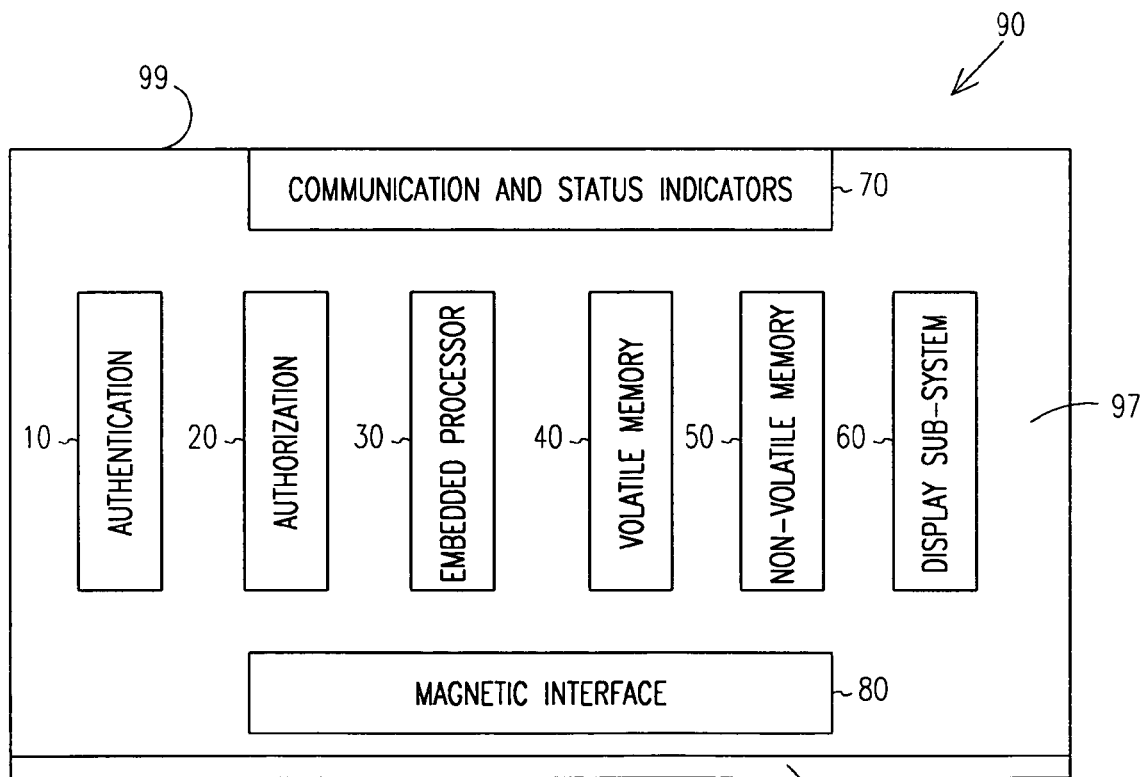
FIG. 4 is a layout of a card for a card based system in accordance with various embodiments.

FIG. 4 is a layout of a card 90 for a card based system in accordance with various embodiments of the present invention. The card 90 includes an authentication block 10 and authorization block 20 whose functions were mentioned supra. Further the card 90 includes an embedded processor 30, volatile memory 40 and non-volatile memory 50, both coupled to processor 30.

In an embodiment, embedded processor 30 is implemented on a chip. A chip is a semiconductor device. In other embodiments, embedded processor 30 as well as volatile memory 40 and non-volatile memory 50, are implemented as part of a chip-set. However, the implementation is not limited to these configurations. The chip or chip-set may be implemented on a semiconductor device fabricated by various technologies known to those of ordinary skill in the art such as silicon, gallium arsenide or combination thereof, etc.

In an embodiment, card 90 has the communication and status indicators 70. The communication portion of the communication and status indicators 70 provide for wireless or wired communications with computer 75. In addition, the communication portion of the communication and status indicators 70 provides for wireless or wired communications with one or more types of card readers 85. In various embodiments, the communication and status indicators 70 comprise a chip or chip-set implemented in various technologies, such as, silicon or gallium arsenide or a combination thereof.

Since there is a large infrastructure in place at of shops, agencies, institutions, and organizations that depend on magnetic stripe scanning of individual cards, card 90 maintains backward or downward compatibility with wireless reader/writer 84 and card writer 86 as well as wireless card readers 85 or combinations thereof. FIG. 4 further depicts a magnetic interface 80 and magnetic stripe 98.

Card device 90 has a magnetic stripe 98, for example a ferromagnetic stripe, with same dimensions and encoding mechanism as typical magnetic stripe cards. In an embodiment, the magnetic stripe 98 on the card 90, however, is dynamically encoded by the card writer 86 under control of the processor 30. A code is sent from processor 30 through reader/writer 84 to card writer 86, depending on a selected card profile. The magnetic stripe 98 is then swiped through card writer 86 to write magnetic stripe 98. Once the magnetic stripe 98 is encoded appropriately for a particular card profile, the card 90 behaves exactly like a fixed type card from the issuing agency. In an embodiment, magnetic interface 80 reads the stripe 98 for verification of proper coding. Any transaction can be handled as the transaction is handled normally. Transaction card 90 will, therefore, represent multiple fixed cards without sacrificing backward/downward compatibility.

In some embodiments, the magnetic stripe writer is an external device that is operable to receive magnetic stripe data from the transaction card such as through a wireless connection, and to write the data onto the magnetic stripe of the transaction card so that it can be used at a point of sale terminal or other device incorporating a magnetic stripe reader. An establishment such as a department store or supermarket using magnetic stripe readers can employ one or two card writers that holders of such transaction cards can use to write the desired data to the card's magnetic stripe, reducing the investment needed to support the advanced transaction cards.

In an embodiment, the front face 97 of the card 90 provides a touch screen for input and a display screen for card user input and output. A thin-film flexible touch screen and display as is well known in the art can be used on card face 97.

In an embodiment, a back surface 99 card 90 includes traditional authentication information. This traditional authentication information includes, but is not limited to, a signature, a photograph of the card holder embedded in plastic, serial numbers, a holograph, etc. The card 90 in some embodiments also includes user-accessible features such as a battery compartment, or a stylus for use with the touchscreen display.

FIG. 5 is a graphic display arrangement 500 of card face 97 of FIG. 4 for a card based system in accordance with various embodiments of the present invention. FIG. 5 depicts a typical menu 500 of fixed cards as displayed on front face 97 of card 90. The fixed card types include but are not limited to social security card, credit cards, bank cards, library cards, parking cards, club cards (such as discount clubs, etc.), driver's licenses, identification cards, entry cards, and medical insurance cards. It is to be noted that virtually any number of "fixed or physical cards" of any transaction type can be eliminated and put on the single card device 90.

Figure 6:
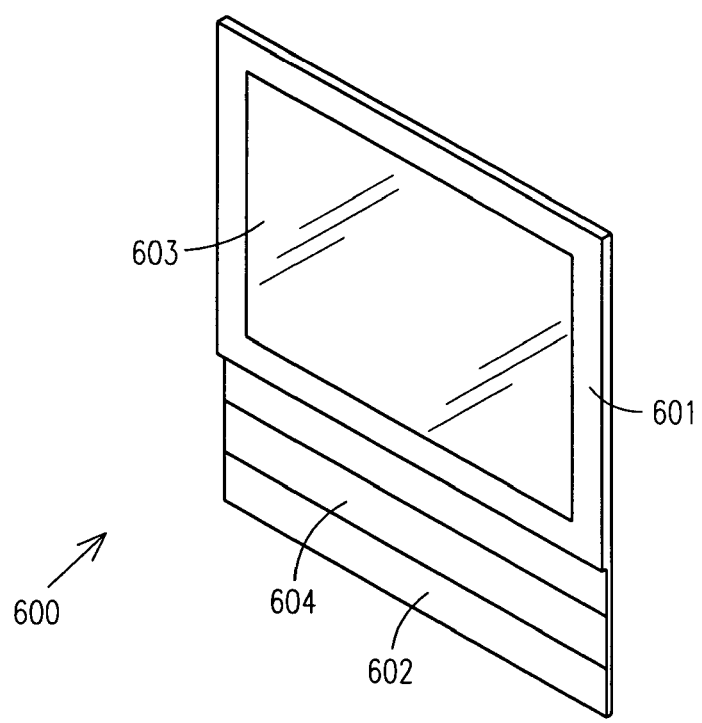
FIG. 6 is a diagram of a transaction card, consistent with various embodiments of the invention.

FIG. 6 shows an example transaction card, consistent with various embodiments of the invention. In this example, a card shown generally at 600 includes a top portion 601 that is somewhat thicker than a bottom portion 602, so that the bottom portion remains thin enough to be inserted in a traditional magnetic stripe swipe reader such as is commonly found on point of sale systems and automatic teller machines. The top portion of the card 601 is in various embodiments thicker, as may be necessary to house various electronic components such as a processor, a battery, or touchscreen display 603.

A magnetic stripe 604 or another feature designed to emulate an electronic stripe is located at a standard distance and is a standard height relative to current magnetic stripe card standards, which in one example is a magnetic stripe approximately four millimeters from the card edge and extending nine millimeters wide. The magnetic stripe in some embodiments is a traditional magnetic material that is rewritable using an external card writer, such as the rewriter device previously disclosed for changing a magnetic stripe based on transaction account information received from the card for compatibility with traditional stripe readers can be used to rewrite the stripe on-site at a place of business, enabling legacy magnetic stripe compatibility at the point of sale terminals or other magnetic stripe readers.

In another example embodiment, the magnetic stripe further comprises a series of conductors operable to rewrite the magnetic pattern encoded in the transaction card's magnetic stripe by selective application of current to the conductors. The conductors in one such example comprise a series of inductive loops, each loop operable to create magnetic fields by application of a current to the loop using either a forward or reverse polarity. These embodiments enable the card to rewrite itself, eliminating the need for an external magnetic stripe writer. A transaction card holder using such a card could simply select the desired magnetic stripe using the touchscreen display 603, and rewrite the stripe without external assistance.

In other embodiments, the stripe is not a traditional magnetic material, but is another material such as a ferromagnetic semiconductor film that can be controlled using coupled electronics. One example of such a material is the gallium manganese nitride film described in U.S. Pat. No. 6,869,806, titled "Method and Apparatus for the Production of a Semiconductor Compatible Ferromagnetic Film". This patent describes a semiconductor film having reconfigurable electron spin characteristics, which can be used as magnetic stripe 604 and having magnetic properties that can be easily reconfigured by application of appropriate electrical signals to various portions or elements of the magnetic stripe.

In another embodiment, the magnetic stripe is replaced with an inductive loop covering at least a portion of magnetic stripe region 604. To use the card, the card is placed in the magnetic stripe swipe card reader and the desired transaction card data is retrieved such as by using the touchscreen interface 603. Rather than relying on movement of the card through the stripe reader to scan data encoded in a magnetic stripe past the read head of the stripe reader, the data is provided by varying the signal applied to the inductive loop covering at least a portion of magnetic stripe region 604. The pattern and timing of the signal applied to the inductive loop convey the appropriate transaction card to the stripe reader's read head via the electromagnetic field generated by varying the signal in the inductive loop, thereby conveying the data without the need for a permanently magnetized stripe material. In some such embodiments, the physical size of the transaction card 600 can be reduced significantly, because a full-length magnetic stripe is not required. This enables other form factors, such as a keychain fob or other small device, to make the transaction card even more convenient for the user.

These examples illustrate how a transaction card supporting more than one transaction profile can be used to provide a user-selected transaction profile to another party such as a retail store, an automatic teller machine, or a magnetic stripe security card reader. The transaction profile information is conveyed in various embodiments through a magnetic stripe, through a wireless link, or through other technologies such as a ferromagnetic semiconductor film or inductive loop. The transaction card owner can select the transaction profile to be conveyed in some embodiments via interfaces such as buttons or a touchscreen, enabling replacement of many traditional transaction card with a single transaction card supporting multiple transaction types or profiles as described herein.

It should be noted that the methods described herein do not have to be executed in the order described, or in any particular order. Moreover, various activities described with respect to the methods identified herein can be executed in serial or parallel fashion. In the foregoing Detailed Description, various features may be grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter may be in less than all features of a single disclosed embodiment. Thus the following claims are hereby incorporated into the Detailed Description, with each claim standing on its own as a separate preferred embodiment. Individual claims may encompass multiple embodiments of the inventive subject matter.

Although some embodiments of the invention have been illustrated, and those forms described in detail, it will be readily apparent to those skilled in the art that various modifications may be made therein without departing from the extent of the invention or from the scope of the appended claims.

What is claimed is:

1. A transaction card, comprising:
   a memory operable to store a plurality of transaction profiles associated with a transaction card holder;
   a user interface to receive input from the transaction card holder; and
   a communications interface to convey one of the plurality of transaction profiles selected via the user interface to a transaction party other than the transaction card holder, the communications interface comprising an electromagnetic element and configured to emulate a magnetic stripe by varying a signal applied to the electromagnetic element while the element remains stationary in a transaction party's magnetic stripe reader such that the varying electromagnetic field generated by the electromagnetic element appears to the magnetic stripe reader to be a moving magnetic stripe.

2. The transaction card of claim 1, wherein the plurality of transaction profiles comprise transaction profiles from a plurality of transaction account issuers.

3. The transaction card of claim 1, wherein the communications interface comprises a wireless interface.

4. The transaction card of claim 1, further comprising an authenticator to authenticate the identity of the holder of the transaction card via at least one immutable physical characteristic.

5. A method of operating a transaction card, comprising:
   storing a plurality of transaction profiles in the transaction card associated with a transaction card holder;
   receiving input from the transaction card holder; and
   conveying one of the plurality of transaction profiles selected via a user interface to a transaction party other than the transaction card holder via a communications interface comprising an electromagnetic element and configured to emulate a magnetic stripe by varying a signal applied to the electromagnetic element while the element remains stationary in a transaction party's magnetic stripe reader such that the varying electromagnetic field generated by the electromagnetic element appears to the magnetic stripe reader to be a moving magnetic stripe.

6. The method of claim 5, wherein the plurality of transaction profiles comprise transaction profiles from a plurality of transaction account issuers.

7. The transaction card of claim 5, further comprising authenticating the identity of the holder of the transaction card via at least one immutable physical characteristic.

8. A machine-readable medium with instructions stored thereon, the instructions when executed operable to cause a computerized transaction card system to:
   store a plurality of transaction profiles in the transaction card associated with a transaction card holder;
   receive input via a transaction card user interface from the transaction card holder; and
   convey one of the plurality of transaction profiles selected via a user interface to a transaction party other than the transaction card holder via a communications interface comprising an electromagnetic element and configured to emulate a magnetic stripe by varying a signal applied to the electromagnetic element while the element remains stationary in a transaction party's magnetic stripe reader such that the varying electromagnetic field generated by the electromagnetic element appears to the magnetic stripe reader to be a moving magnetic stripe.

9. The machine-readable medium of claim 8, wherein the plurality of transaction profiles comprise transaction profiles from a plurality of transaction account issuers.

10. The machine-readable medium of claim 8, the instructions further operable when executed to authenticate the identity of the holder of the transaction card via at least one immutable physical characteristic.

* * * * *